Oct. 12, 1965 R. J. KAEHLER 3,211,603

APPARATUS FOR TRANSFERRING MAGNETIC STRIPES TO A RECORD SHEET

Filed Oct. 2, 1961 10 Sheets-Sheet 1

INVENTOR
ROBERT J. KAEHLER

BY Louis A Kline
Richard W Lavin
HIS ATTORNEYS

APPARATUS FOR TRANSFERRING MAGNETIC STRIPES TO A RECORD SHEET

Filed Oct. 2, 1961

INVENTOR
ROBERT J. KAEHLER

BY Louis A. Kline
Richard W. Lavin
HIS ATTORNEYS

APPARATUS FOR TRANSFERRING MAGNETIC STRIPES TO A RECORD SHEET

Filed Oct. 2, 1961 10 Sheets-Sheet 3

INVENTOR
ROBERT J. KAEHLER

BY Louis A. Kline
Richard W. Lavin
HIS ATTORNEYS

APPARATUS FOR TRANSFERRING MAGNETIC STRIPES TO A RECORD SHEET

Filed Oct. 2, 1961

10 Sheets-Sheet 4

INVENTOR
ROBERT J. KAEHLER

BY Louis A Kline
Richard L. Lavin
HIS ATTORNEYS

INVENTOR
ROBERT J. KAEHLER

BY Louis A. Kline
Richard W. Lavin
HIS ATTORNEYS

Oct. 12, 1965 R. J. KAEHLER 3,211,603

APPARATUS FOR TRANSFERRING MAGNETIC STRIPES TO A RECORD SHEET

Filed Oct. 2, 1961 10 Sheets-Sheet 6

INVENTOR
ROBERT J. KAEHLER

BY Louis A Kline
Richard W Lavin
HIS ATTORNEYS

Oct. 12, 1965 R. J. KAEHLER 3,211,603

APPARATUS FOR TRANSFERRING MAGNETIC STRIPES TO A RECORD SHEET

Filed Oct. 2, 1961 10 Sheets-Sheet 7

INVENTOR
ROBERT J. KAEHLER

BY Louis A. Kline
Richard W. Lavin
HIS ATTORNEYS

INVENTOR
ROBERT J. KAEHLER

BY Louis A. Kline
Richard W. Lavin
HIS ATTORNEYS

INVENTOR
ROBERT J. KAEHLER
BY
HIS ATTORNEYS

Oct. 12, 1965 R. J. KAEHLER 3,211,603

APPARATUS FOR TRANSFERRING MAGNETIC STRIPES TO A RECORD SHEET

Filed Oct. 2, 1961 10 Sheets-Sheet 10

INVENTOR
ROBERT J. KAEHLER

BY Louis A. Kline
Richard W. Lavin
HIS ATTORNEYS

United States Patent Office 3,211,603
Patented Oct. 12, 1965

3,211,603
APPARATUS FOR TRANSFERRING MAGNETIC STRIPES TO A RECORD SHEET

Robert J. Kaehler, Xenia, Ohio, assignor to The National Cash Register Company, Dayton, Ohio, a corporation of Maryland Filed Oct. 2, 1961, Ser. No. 142,155
6 Claims. (Cl. 156—540)

This invention relates to an apparatus for applying a plurality of stripes of magnetic material to a record sheet. As disclosed in the co-pending United States patent application of Robert D. Fremgen, Serial No. 783,023, filed December 26, 1958 now abandoned, a coating which includes a binder material, a plasticizer, and magnetic powder is applied to one side of a strip of transfer film. After the coating has dried, the strip of transfer film is applied to one side of a record sheet by the use of heat and pressure. This application of heat and pressure results in the bonding of the magnetic material to the record sheet. The transfer film is then removed, leaving a strip of magnetic material attached to the record sheet. Therefore, it is an object of the invention to provide an apparatus which will transfer a number of parallel strips of magnetic material to a record sheet.

It is another object of this invention to provide an apparatus which will transfer strips of magnetic material to a record sheet at a relatively high rate of speed.

It is a further object of this invention to provide novel take-up means for the transfer film after it has been separated from the record sheet.

With these and incidental objects in view, the invention includes certain novel features of construction and combinations of parts, the preferred form or embodiment of which is hereinafter described with reference to the drawings which accompany and form a part of this specification.

In general, the invention provides a heated die element which is operated by the positioning of a record sheet to engage a strip of transfer film, coated with magnetic material, and press it against the positioned record sheet, thereby allowing a coating of magnetic material to be bonded to the record sheet. Means are provided to position the transfer film and the record sheet adjacent the heated die element. Driving means are also provided for intermittently engaging the transfer film, thereby moving the bonded record sheet past means for cooling the transfer film and the bonded coating of magnetic material. The bonded record sheet is then transported by the transfer film to a receiving area, where the transfer film is separated from the bonded record sheet. The take-up means for the separated transfer film comprises a vacuum source which tensions the transfer film when the driving means is not engaging the film and transports the separated transfer film into a collection container when the driving means is engaged with the transfer film.

In the accompanying drawings, which form part of the instant specification and which are to be read in conjunction therewith, and in which like reference numerals are used to indicate like parts in the various views:

FIGS. 1A, 1B, 1C together constitute a front overall view of the apparatus.

FIGS. 2A and 2B together constitute a top view of the feed table, showing the belt system for transporting the record sheet to a position adjacent the die element and the driving means for the belt system.

Figure 1A:
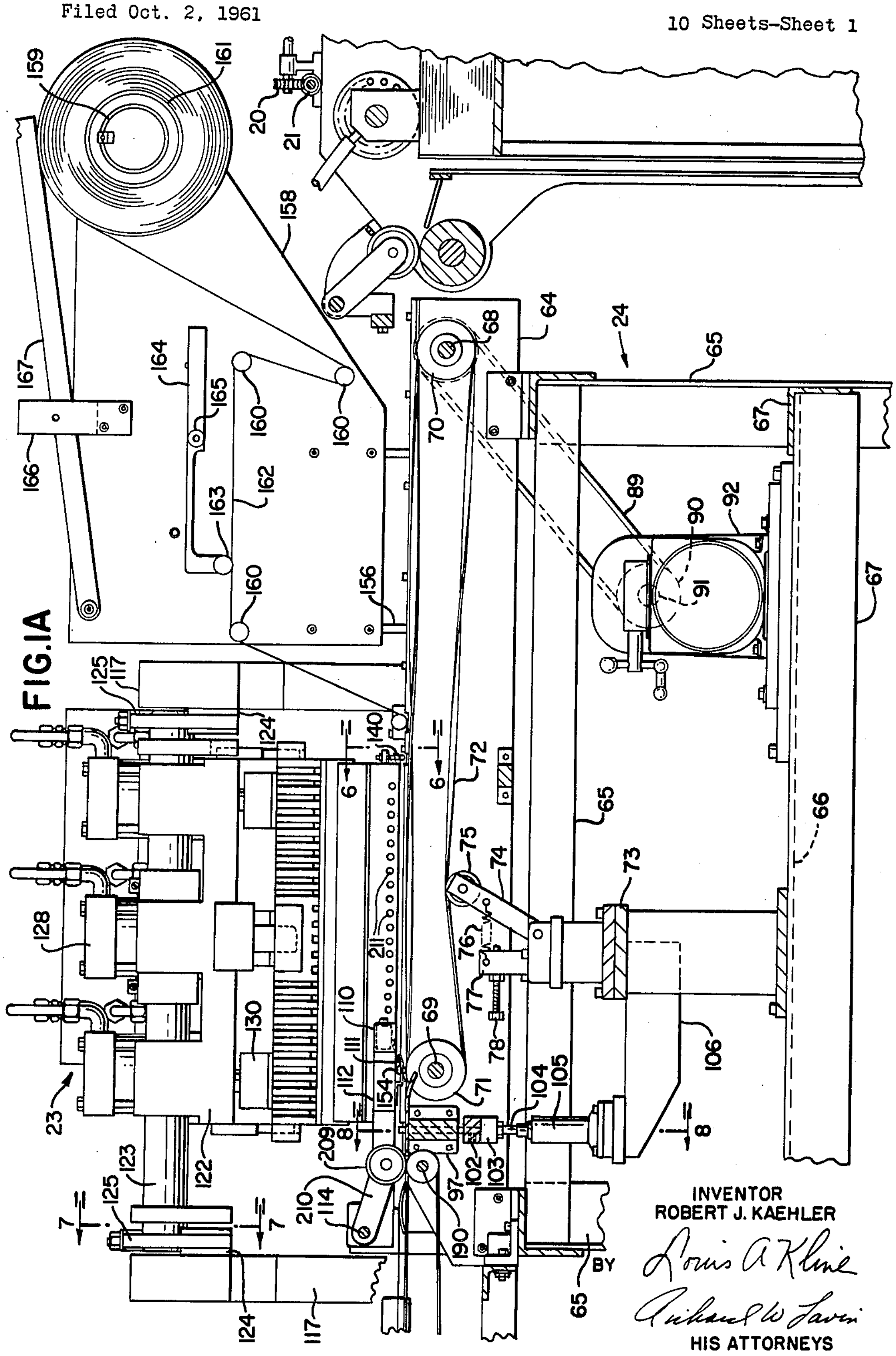
Figure 1B:
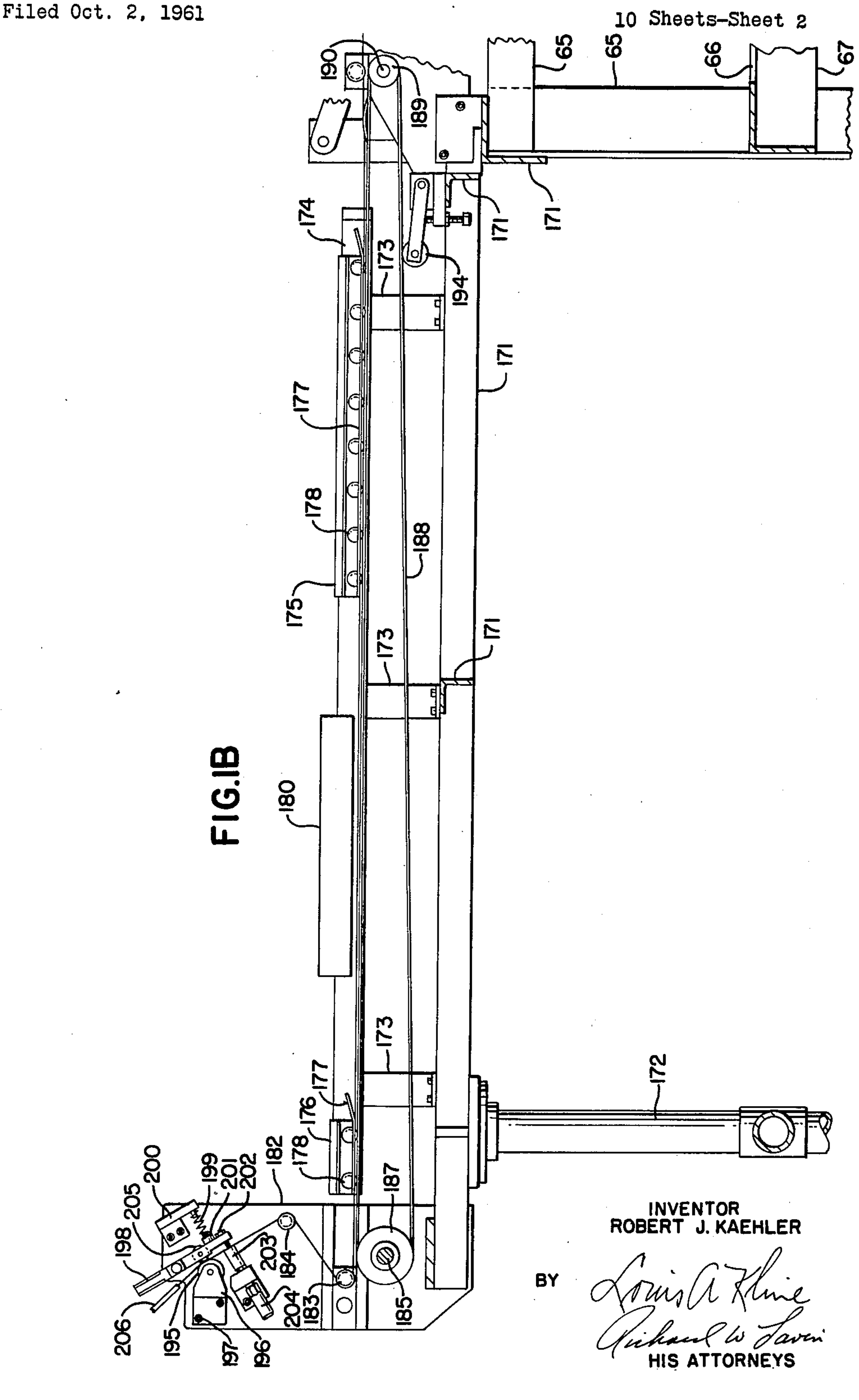
Figure 1C:
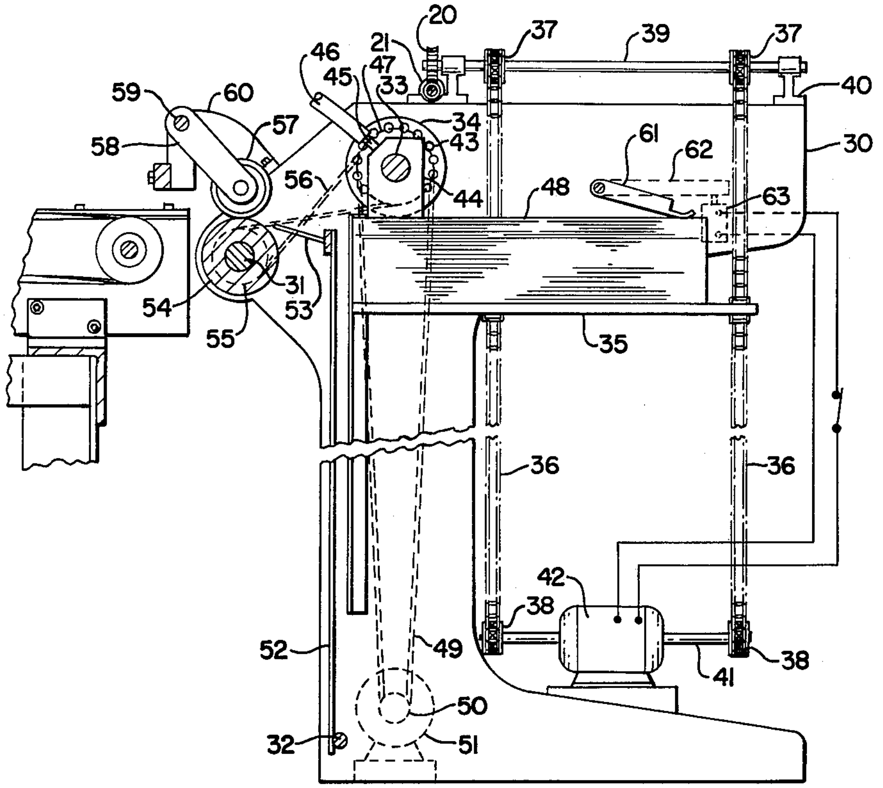

Referring now to FIGS. 1A, 1B, and 1C, there is shown the general arrangement of the various structures that make up the apparatus. FIG. 1C shows the supporting structure for the record sheets, which includes a pair of side frames 30. Mounted between the side frames for support is a shaft 32. Journaled between the side frames 30 are shafts 31 and shafts 33, to which is mounted a feed roller 34. Associated with the feed roller is a platform 35, mounted for vertical movement between the side frames 30. The platform 35 is attached on its sides to a pair of endless chain belts 36, each of which passes over a pair of sprocket wheels 37 and 38. The sprocket wheel 37 is secured to a shaft 39, rotatably supported by a support member 40, located on the top edge of the side frame 30. The sprocket wheel 38 is mounted on the drive shaft 41 of a motor 42, located beneath the platform 35. Upon energization of the motor 42, the chain belts 36 are driven to move the platform in an upward direction. While only one pair of chain belts have been illustrated, another pair of chain belts are located on the other side of the platform and are arranged to operate in a similar manner. A worm gear 20, mounted on the end of the shaft 39, engages and drives a shaft 21, which is connected to a similar worm gear, mounted on a shaft located on the other side frame for driving the other pair of sprocket wheels. With this arrangement, the platform 35 is moved without danger of tipping or jamming.

Located on the platform 35 is a stack of record sheets 48, the top sheet of which is positioned against the feed roller 34. The roller 34 has located on its peripheral edge a plurality of holes (not shown), which communicate with a series of passageways 43, extending through the roller. Mounted adjacent the feed roller 34 is a header 44, within which is located a chamber (not shown), which has, adjacent its lower end, an outlet communicating with the passageways 43 of the feed roller as they move past the lower portion of the header 44. On the top portion of the header is located a hose connection 45, to which is attached a hose 46, leading to a conventional vacuum pump (not shown). Upon operation of the vacuum pump, a vacuum is created in the chamber of the header 44, which vacuum provides a suction force within each passageway 43 of the feed roller 34 as the passageways are positioned adjacent the outlet of the chamber. This vacuum force is then transmitted from the passageway 43 to the holes in the peripheral edge of the feed roller 34, which at this time is positioned adjacent the top record sheet on the paltform 35. This results in the record sheet's being engaged and transported from the stack by the feed roller.

Mounted on one end of the shaft 33 and located on the outside of the side frame 30 is a double pulley wheel 47. A belt 49, mounted on one of the pulley wheels 47, is attached to the drive shaft 50 of a motor 51, located adjacent one of the side frames 30. Operation of the motor 51 drives the shaft 33 and the feed roller 34 clockwise as viewed in FIG. 1C. Mounted on a frame member 52, attached to one of the side frames 30, is an operating handle 53. Movement of this handle by the operator operates the conventional vacuum pump, which creates the vacuum, as described previously, within the passageways 43 of the feed roller 34 as each passageway moves past the lower portion of the header 44. As the top record sheet of the stack 48 is moved by the feed roller 34, it engages a feed roller 54, secured to the shaft 31. A pulley 55, mounted on one end of the shaft 31, is driven by a belt 56, the other end of which is mounted on the pulley 47. It is seen from this arrangement that the shaft 31 is driven by the motor 51, which also drives the shaft 33, as previously described.

Rotation of the feed roller 54 drives a pressure roller 57, carried by an arm 58, mounted on a shaft 59, extending between two support members 60, each of which is mounted on a side frame 30. Thus it is evident from this construction that, when the record sheet is transported from the stack 48, it is fed by the feed roller 34 into engagement with the rollers 54 and 57, which, as will be described hereinafter, feeds the sheet onto a series of feed belts for transporting the sheet to the die element for the purpose of having the magnetic material bonded thereto.

Rotatably mounted on the side frame 30 and positioned adjacent the stack of record sheets 48 so as to engage the top record sheet is a feeler arm 61. The arm 61 has attached thereto a pressure arm 62, the end of which engages the plunger of a normally-opened pressure switch 63. The switch 63 is part of an energizing circuit to the motor 42. Upon the feeding of a number of record sheets from the stack 48, the feeler arm 61 rotates clockwise, thereby causing the arm 62 to press the plunger switch 63, which closes the switch and completes an energizing circuit to the motor 42. Operation of the motor raises the platform 35 in the manner described previously until the arm 62 releases the plunger, thereby opening the switch 63, resulting in the de-energization of the motor 42. With this arrangement, the stack of record sheets will always be engaged by the feed roller 34, thereby providing a constant flow of record sheets from the stack 48.

Referring now to FIG. 1A, there are shown the die press generally indicated as 23, and the feed table generally indicated as 24, for positioning the record sheet adjacent the heated die element after the sheet has been fed from the stack 48. Also shown is a supply reel of transfer film and guide means for guiding the transfer film to a point adjacent the die element and the transfer sheet, as will be described more fully hereinafter.

The feed table is composed of two longitudinally spaced beams 64 (FIG. 2A), supported by a box-like structure consisting of beam members 65. Located immediately below the feed table is a platform 66, supported by beams 67, which in turn are bolted to the upright beams 65. Journaled between the beams 64 are two shafts, 68 and 69, each located at opposite ends of the feed table. Pinned to the shaft 68 are a plurality of pulleys 70 (FIG. 2), while pinned to the shaft 69 are pulleys 71. As shown more clearly in FIG. 2A, extending between and engaging the pulleys 70 and 71 are a number of twisted belts 72. When driven, this system of belts provides means for transporting the record sheets from the record-sheet-feeding apparatus described hereinbefore to a position adjacent the die element. Located below the system of belts 72 is a support member 73, extending in a transverse direction across the feed table. The member 73 is mounted on the platform 66. Rotatably mounted on the support member are a plurality of arms 74, each arm being associated with one of the belts 72. Mounted on the end of each arm 74 is a roller 75, which engages and tensions its associated belt. A spring 76, mounted between the arm 74 and a stem portion 77 of the support member 73, urges the roller 75 into engagement with the belt 72. A screw 78, mounted on the stem portion 77, controls the amount of tension that is applied by the rollers 75 to the belts 72.

Figure 2A:
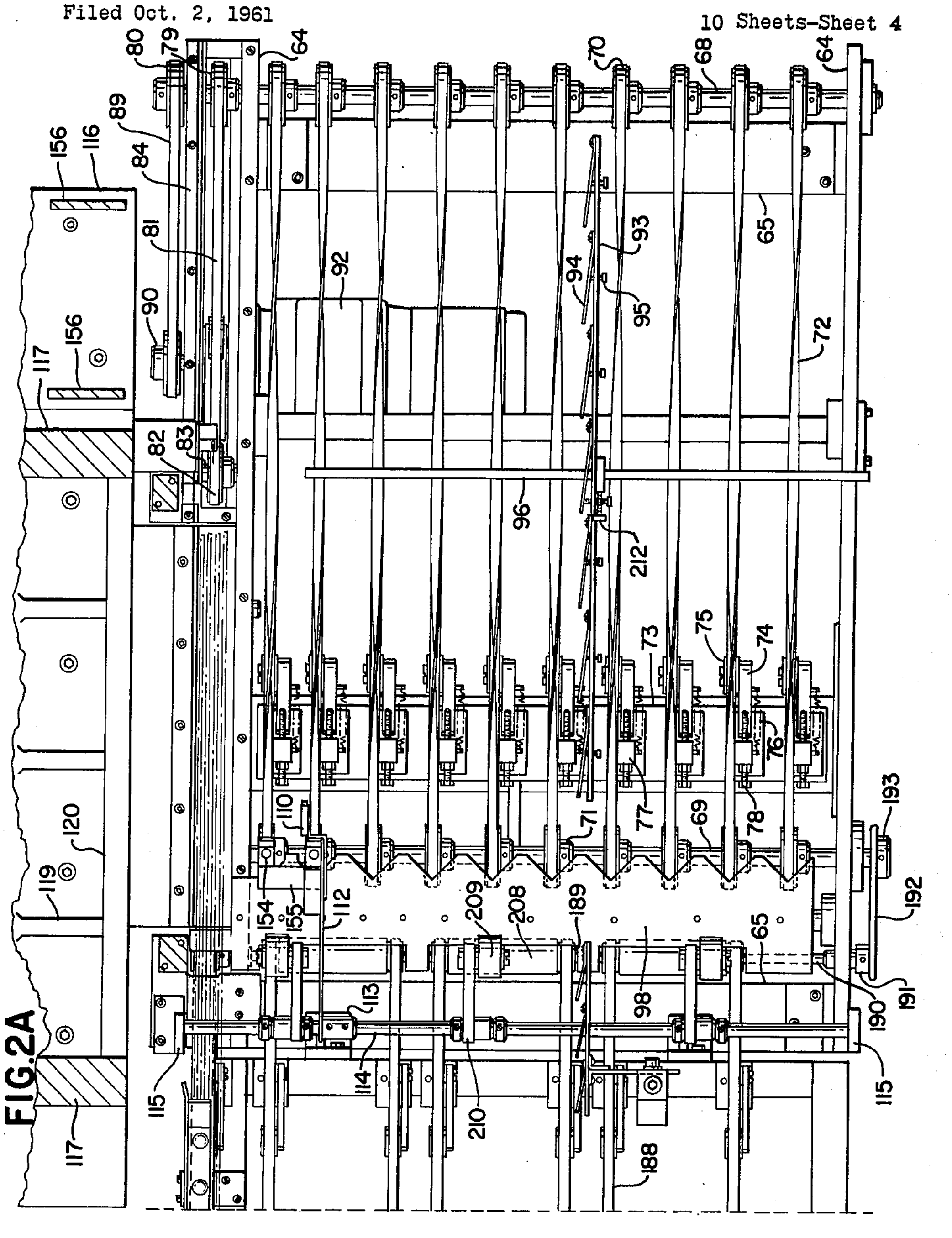

Referring to FIG. 2A, it may be seen that extending through the inside beam 64 is one end of the shaft 68, on which are pinned the pulleys 79 and 80. The pulley 79 is engaged by an endless belt 81 (FIG. 5), the other end of which is mounted on a pulley 82, pinned to a shaft 83, which is in turn supported between a beam 84 and the beam 64. The belt 81 helps to transport the record sheet along the feed table. Positioned beneath the belt 81 is a tension roller 85 (FIG. 5), rotatably mounted on an arm 86, which in turn is rotatably secured to a beam 88 of a support table for the die element, generally indicated as 25 (FIGS. 4 and 5), which will be described hereinafter. An adjustment screw 87, also mounted on the beam 88, controls the amount of tension exerted by the roller 85 on the belt 81.

The pulley 80 (FIG. 2A), pinned on the end of the shaft 68, is engaged by a belt 89, which is driven by a pulley 90, which in turn is mounted on the drive shaft 91 of a motor 92 (FIG. 1A), located on the platform 66. Energization of the motor 92 drives the shaft 68 counterclockwise as viewed in FIG. 1A. This allows the belt 72 to be driven in such a direction as to transport the record sheet toward the die element.

To insure that the record sheet is properly aligned in relation to the die element as it is transported on the belt 72, there is positioned on the feed table an adjustable guide fence comprising a rail 93 (FIG. 2A), to which are mounted a series of flexible members 94, each having one end extending away from the rail by means of an adjustment screw 95, also mounted on the rail 93. With this arrangement, minute adjustment can be made as to the positioning of the record sheet on the feed table. The rail 93 is supported on a rod 96, mounted to the beam 64. The rail 93 is positioned along the rod 96 by means of a set screw 212. This allows the feed table to accommodate any size of record sheets which may be processed.

Figure 8:
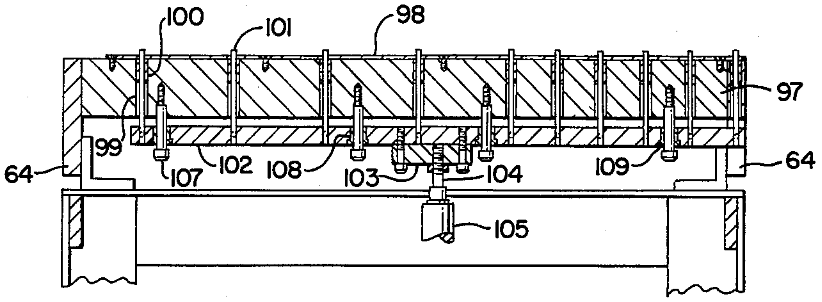
FIG. 8 is a detailed sectional view of the rods for blocking the movement of the record sheet, taken on lines 8—8 of FIG. 1A.

There will now be described means for positioning the record sheet adjacent the die element to receive the strips of magnetic coating. Located adjacent the plurality of pulleys 71 (FIG. 1A), and mounted between the front and rear beams 64 of the feed table, is a guide block 97 (FIG. 8). Mounted on top of the block 97 is a receiving plate 98 (FIG. 2A). Located within the guide block and extending through the plate 98 are a series of drilled holes 99, within each of which is located a bushing 100. Slidably located within each hole is a rod 101, having one end secured to a rod support 102, which in turn is mounted by means of a block 103 to the piston 104 of a conventional air-driven actuator 105. The actuator 105 is mounted on a cantilever beam 106 (FIG. 1A), which is attached to the support member 73. The rod support 102 is limited in movement by a plurality of bolts 107 (FIG. 8), each mounted in the lower surface of the guide block 97 and extending through an aperture 108 in the rod support 102. The head of each bolt limits the downward movement of the rod support 102.

Figures 4, 6, 7:
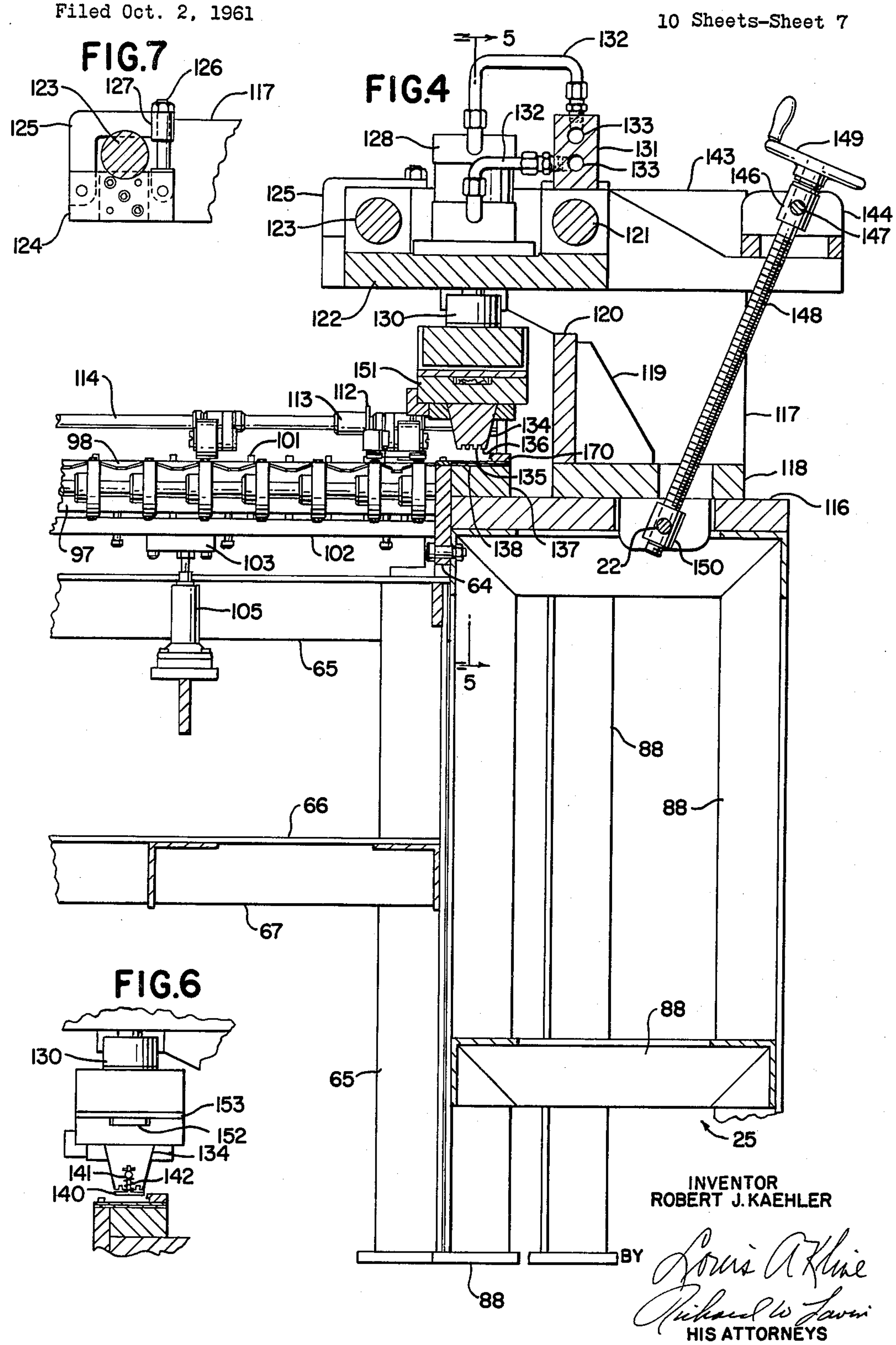
FIG. 4 is a sectional detailed view taken along the lines 4—4 of FIG. 3.
FIG. 6 is a sectional end view of a die element, taken on lines 6—6 of FIG. 1A.
FIG. 7 is a sectional view of a fastening means for the die element, taken on lines 7—7 of FIG. 1A.

Controlling the operation of the actuator 105 is a micro switch 110 (FIGS. 1A and 2A), located on the feed table and having a switch arm 111 extending down into the path of travel of the record sheet being transported on the belt 72. The switch 110 is mounted on a switch holder 112, secured by means of a bracket 113 to a rod 114 (FIGS. 1A, 2A, and 4), which in turn is mounted by means of a support member 115 to the feed table. As the record sheet is transported by the belts 72, the sheet engages and operates the switch arm 111 of the micro switch 110, which results in upward movement of the piston 104 of the actuator. This upward movement positions the top of the rods 101 as shown in FIGS. 1A, 4, and 8 to block any further movement of the record sheet. The blocking of the record sheet by the rods 101 positions the record sheet beneath the die element, which element is then actuated to press a number of strips of transfer film against the sheet, as will be described more fully hereinafter. To allow the leading edge of the record sheet to properly engage the rods 101, the plate 98 has its rear edge serrated (FIG. 2A), with the ends turned downwardly, as shown in FIGS. 1A and 4.

Associated with the two inboard pulleys 71 (FIGS. 1A and 2A) of the feed table are a pair of ball bearings 154, each bearing located in a support 155, mounted on the switch holder 112. The ball bearings function to keep the record sheet flat against the receiving plate 98.

Figure 3:
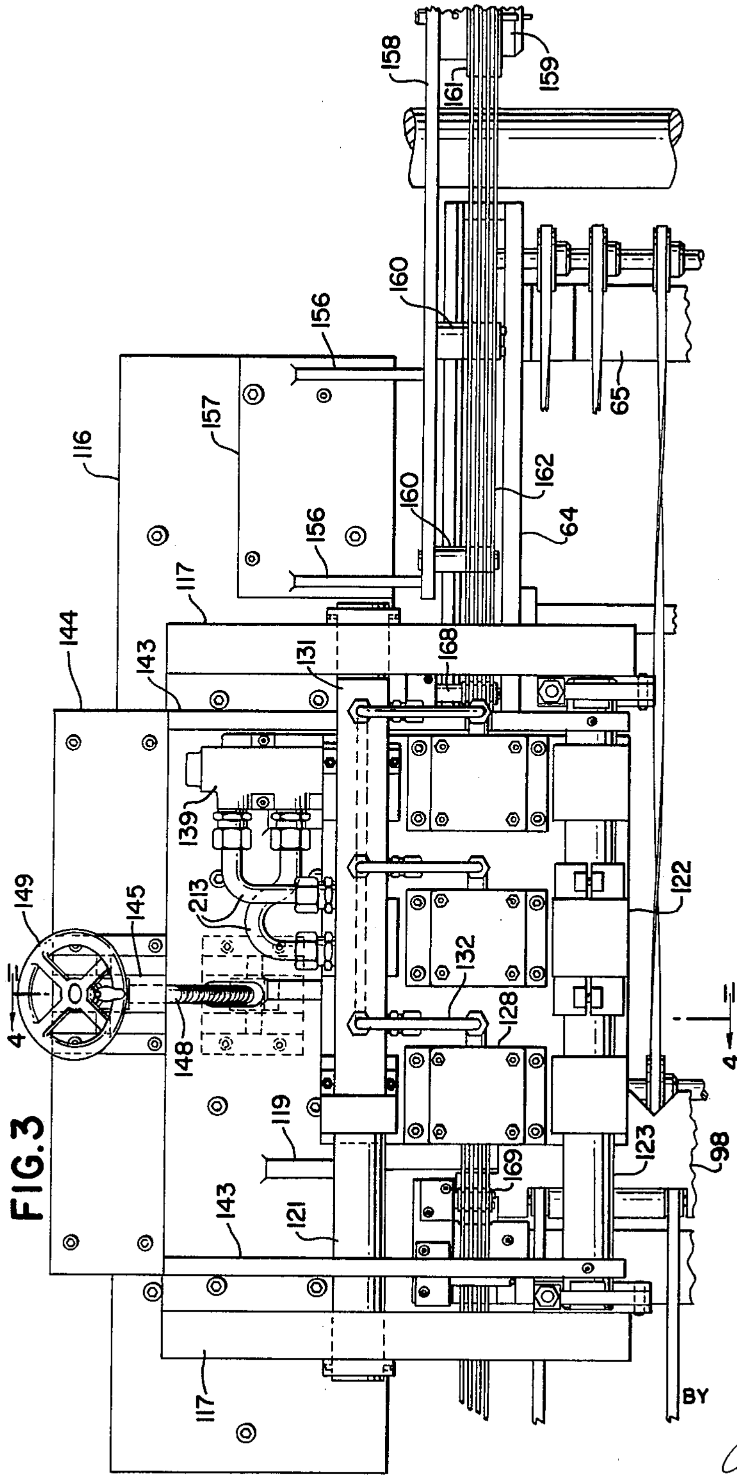
FIG. 3 is a top view of the structure supporting the heated die element, showing the air valve for operating the actuating pistons.

Referring now to FIGS. 1A, 3 and 4, there is shown, located adjacent the feed table, a stand comprising a steel platform top 116, which is supported by the beams 88. Mounted on the top 116 is a die support comprising two vertical side frames 117 and a base 118, on which is mounted, by means of ribs 119, a vertically-extending plate 120. Supported between the side frames 117 is a bar 121, on which a die support 122 is rotatably mounted. Mounted at the front of the die support 122 is a bar 123. As may best be seen from FIGS. 1A and 7, the ends of the bar 123 are inserted over a shelf portion 124 of the side frames 117. A clamp member 125, pivotally supported on the shelf portion 124, clamps the bar 123, resulting in the locking of the die support in the position shown in FIG. 1A. Associated with the clamp member 125 is a bolt 126 (FIG. 7), which is inserted through an end portion 127 of the clamp member and into the shelf portion of the side frames to lock the clamp member in place. As will be explained hereafter, whenever the die element is to be changed, the bolts 126 are removed, thereby allowing the clamp member 125 to release the bar 123 and the die support 122 for rotation about the bar 121 in a manner to be described.

Located on top of the die support 122 are three air-driven actuators 128 (FIGS. 1A, 3, and 4), each being composed of a cylinder and a piston. Attached to each of the pistons is a shaft 129 (FIG. 5), the lower end of which is threaded into a die holder support 130. Mounted adjacent to the three actuators is a header 131 (FIGS. 3 and 5), in which are located the feed and exhaust conduits 133 (FIG. 4), which in turn are connected to an air valve 139 (FIG. 3) by means of hoses 213. The air valve 139 is actuated by operation of the micro switch 110 (FIG. 1A) in conjunction with the operation of the blocking rods 101. The air valve is actuated immediately after the actuator 105 has been operated to move the rods 101 to a blocking position, as previously described. Actuation of the air valve 139 operates the actuators 128. Each actuator is connected by hoses 132 to operate the feed and exhaust conduits of the header 131 in a manner well known in the art.

Attached to the die holder support 130 is a die holder 151 (FIGS. 4 and 5), having mounted therein an electrical heating element 152 (FIGS. 5 and 6) and a layer of insulation 153. Slidably supported within the die holder is a die element 134. The lower face of the element has a number of serrations 135 (FIG. 5), which provide a contact face 136 for each strip of transfer film. In this embodiment, the die element has four contact faces, which accommodate up to four transfer films. It is obvious that any number of strips of transfer films may be accommodated. The die elements may vary in size to accommodate different lengths of strips which are to be transferred to different sizes of record sheets. Located along the lower edge of the die element 134 are a series of holes 211, extending through the die element and communicating with each of the serrations 135. This construction allows for the escape of air trapped within the serrations when the die element is operated to engage the transfer film.

Located on the platform top 116 of the support stand immediately below the die element 134 is the die bed 137 (FIG. 4), on which is mounted a strip 138 of thermoplastic material. This strip acts to dissipate the heat from the die element. An example of the material used for the strip is Teflon. It will be seen that with this arrangement, upon the tripping of the micro switch 110 by the record sheet, as previously explained, the rods 101 are moved to block the record sheet, which is then followed by the operation of the air valve 139 (FIG. 3). This valve is connected to a conventional air pump, which is not shown in the drawings. Operation of the valve 139 results in each of the pistons of the actuators 128 being moved downwardly, thereby allowing the die element 134 to be moved to a position which allows the contact faces of the die element to engage and press the transfer film against the record sheet. Because of the die element's being heated by the heating element 152, the engagement of the transfer film by the die element bonds the magnetic coating located on the transfer film to the record sheet. The positioning of the transfer film with relation to the die element will be described in more detail hereinafter. It is sufficient to say now that the transfer film is positioned between the die element and the record sheet.

Located on both ends of the die element 134 is a T-shaped guide 140 (FIGS. 5 and 6), slidably mounted in a support 141. A spring 142 urge the guides downwardly, which action results in the pressing and alignment of the strips of transfer film on the record sheet when the die element engages the transfer film and the record sheet.

A method and the means for removing the die element will now be described. Mounted on the two bars 121 and 123 (FIGS. 3, 4 and 5) of the die support are the side frames 143, which support on their end a horizontal platform 144. A slot 145 (FIG. 3), located within the platform 144, has a threaded nut 146 (FIG. 4), rotatably supported between its sides by means of a bolt 147. A screw 148, mounted within the nut 146, has a wheel 149 mounted on its upper end, with its other end positioned within a nut 150, rotatably supported by a bolt 22 to the platform top 116 of the support stand. With this arrangement, the die support 122 may be rotated clockwise as viewed in FIG. 4 about the bar 121 by the turning of the wheel 149. This occurs after the clamp member 125 has been rotated out of engagement with the bar 123, as disclosed previously. Rotation of the die support 122 allows the die element 134 to be removed for repairs or replacement.

Referring now to FIGS. 1A and 3, there is shown, supported on the platform top 116 by means of a pair of ribs 156 and a base 157, a support plate 158, on which are rotatably mounted a hub 159 and a plurality of film guide rollers 160. Mounted on the hub 159 are a number of supply reels 161 of transfer film. While the hub may accommodate any number of reels, four reels are shown for purposes of this disclosure. Each strip 162 of transfer film is guided over the guide rollers 160 by being positioned within grooves located in each of the guide rollers. Positioned between two of the guide rollers 160 and engaging the transfer film are a plurality of tensioning rollers 163, one for each strip of transfer film. Each tensioning roller 163 is mounted at one end of a lever 164, rotatably supported by means of a bolt 165 to the support plate 158. Also mounted on the support plate 158 is a bracket 166, to which are mounted a plurality of drag bars 167, each of which has one of its ends engaging a supply reel of transfer film, thereby providing a drag on the film as the film is unreeled from the supply reel.

Figure 5:
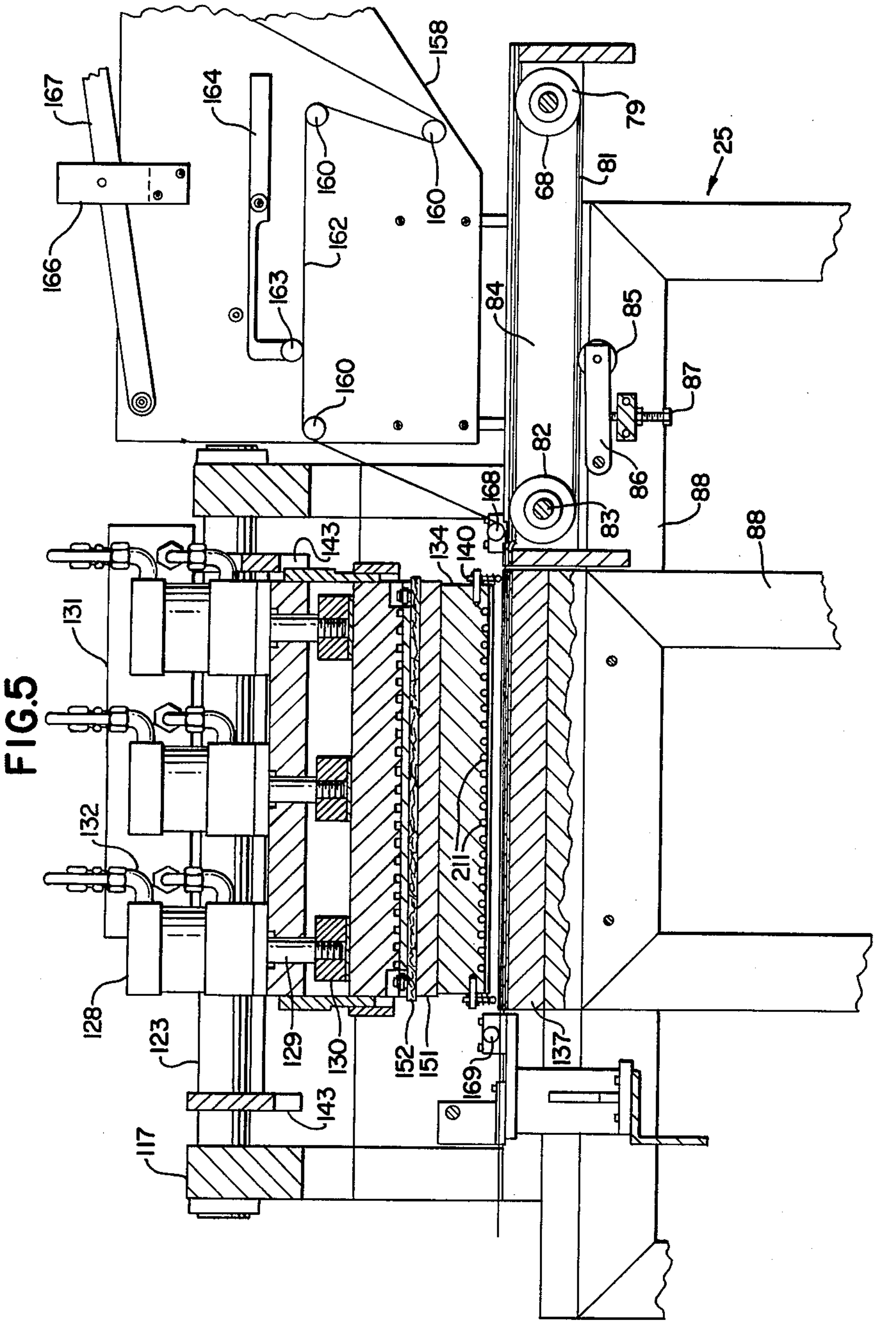
FIG. 5 is a sectional detailed view of the die element, taken on lines 5—5 of FIG. 4.
Figure 9:
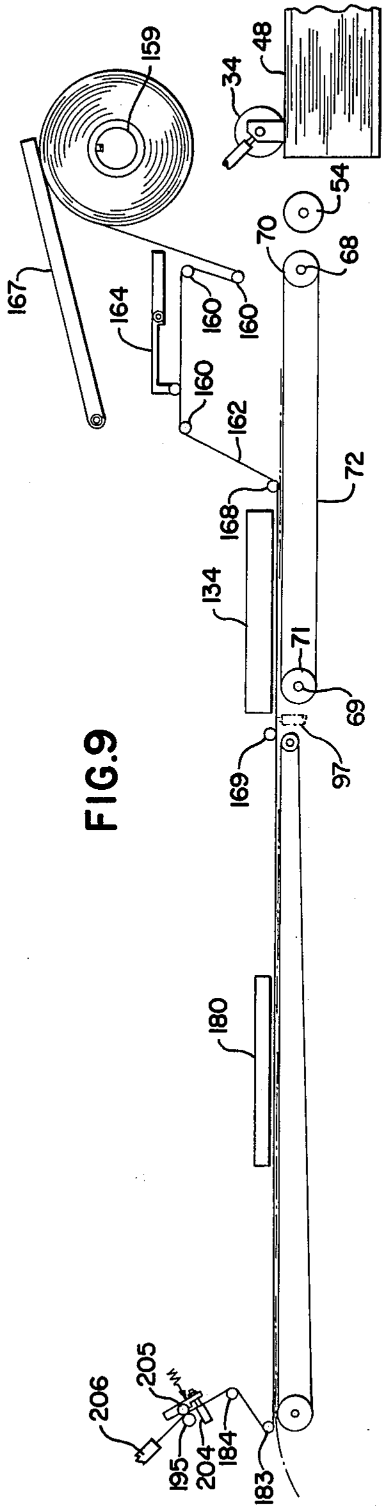
FIG. 9 is a schematic diagram of the paths of travel of the transfer film and the record sheet.

From the guide rollers 160, the strips of transfer film are led to a position beneath the die element 134 by means of a pair of adjustable guide rollers 168 and 169 (FIGS. 3, 5 and 9). The guide rollers 168 and 169 are positioned on either side of the die element 134 and have the same configuration as those of the guide rollers 160. Referring to FIG. 4, it is seen that located on top of the die bed 137 is a guide rail 170, which extends the length of the die bed. The guide rollers 168 and 169 are adjustable along their axes to vary the position of the strips of transfer film in relation to the inner edge of the rail 170. This arrangement allows for the positioning of the strips on the record sheet, which is very critical. As the record sheet is transported by the belt 72 (FIG. 2A), one edge of the sheet is positioned along the rail 170 beneath the strips of transfer film. The coating of magnetic material of the transfer film faces the surface of the record sheet. Upon the blocking of the record sheet by the rods 101 and the actuation of the die element 134, the coating of magnetic material is bonded to the record sheet together with the transfer film, as described previously. After this has occurred, the blocking rods 101 and the die element 134 are returned to their home position.

Figure 2B:
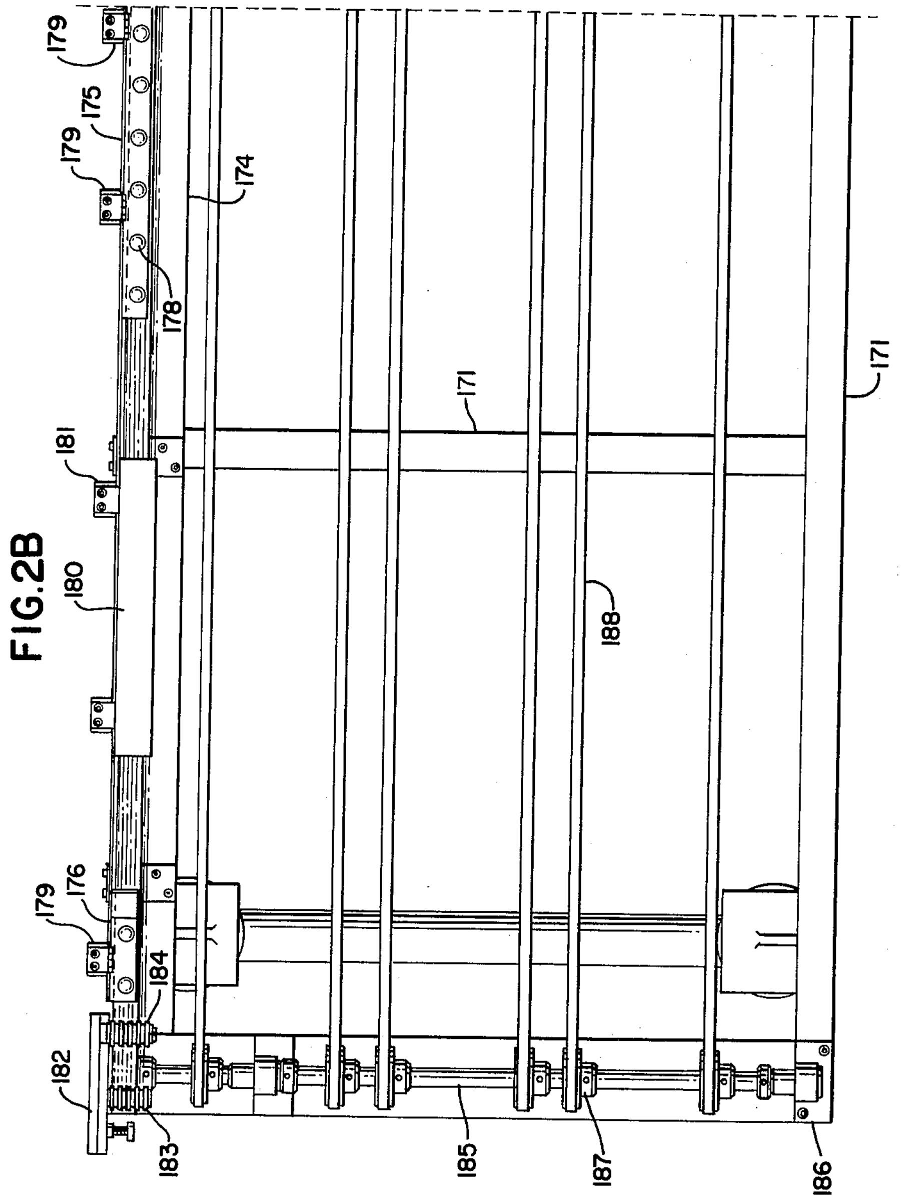

Referring now to FIGS. 1B and 2B, there is shown, attached to the left side beam 65 of the feed table, a support stand consisting of the channel beams 171 and the support legs 172. Mounted on the rear side of the support stand, by means of brackets 173, is an L-shaped beam 174, on which are supported, by means of hinges 179, bearing supports 175 and 176. Each bearing support comprises a holder 177, having a series of apertures within which are positioned the ball bearings 178. The ball bearings act to keep the record sheet aligned and in a horizontal position as the sheet is transported from the feed table.

Positioned intermediate the bearing supports is a cooler 180 (FIG. 1B), mounted by means of hinges 181 to the beam 174 (FIG. 2B). The cooler has, in its lower surface, a plurality of small holes, through which air is blown to cool the strips of transfer film and the magnetic material bonded to the record sheet. This cooling conditions the transfer film to be separated from the strip of magnetic material without the danger of the magnetic material's being ruptured from the record sheet in the process.

Mounted on the left rear end portion of the support table is a plate 182 (FIG. 1B), on which are rotatably supported a pair of guide rollers 183 and 184. Journaled in the lower portion of the plate is a shaft 185, the other end of which is journaled in a support 186 (FIG. 2B), mounted on the outer channel beam 171 of the support table. Pinned to the shaft 185 are a number of pulleys 187, each of which is engaged by an endless flat belt 188. The belt 188 passes over a pulley 189, pinned to a shaft 190, which is rotatably mounted between the beams 64 (FIG. 2A) of the feed table.

Associated with the pulley 189 are a series of drive rollers 208 (FIG. 2A), pinned to the shaft 190. Engaging each of the rollers 208 is a pressure roller 209, rotatably supported on an arm 210, which in turn is supported by the rod 114 (FIG. 1A). These rollers cooperate to keep the record sheet in a flat position as it leaves the area under the die element.

Mounted on one end of the shaft 190 (FIG. 2A) is a pulley 191, which is engaged by one end of a belt 192, the other end of which is mounted on a pulley 193, pinned to the shaft 69. It is seen from this arrangement that the belts 188 and the shaft 190 are driven by the motor 92 by means of the belt 72 and the shaft 59.

Referring to FIG. 1B, there is seen, engaging each of the flat belts 188, a tension roller 194, having a construction and function similar to those described in connection with the tension roller 75 of the belt 72. Operation of the belts 188 contributes to the transportation of the record sheet from the die element to the stacking area. As will be described hereinafter, the control and the transportation of the record sheet, after the magnetic material has been bonded thereto, is mainly accomplished by means of the transfer film.

As seen in FIG. 1B, located on the upper portion of the plate 182 is a roller 195, driven by a belt (not shown) attached to a pulley mounted on the shaft 185. Also positioned on the plate 182 is a pressure roller 205, which engages the drive roller 195. The transfer film moves over the guide rollers 183 and 184 into engagement with the rollers 195 and 205. The driving roller 195 is rotatably mounted on an arm 196, secured to the plate 182 by bolts 197. The pressure roller 205 is rotatably mounted intermediate the ends of an arm 198, which in turn is rotatably mounted on the plate 182. A spring 199, mounted between a stop 200, secured to the plate 182, and a stud 201, located on the arm 198, normally urges the pressure roller into engagement with the driving roller 195. Mounted on the front end of the arm 198 is an adjustment screw 202, one end of which engages the piston 203 of a pneumatic actuator 204, mounted on the support plate 182. Under normal operation, the pneumatic actuator 204 has its piston in its outer position, which moves the pressure roller 205, against the action of the spring 199, from engagement with the drive roller 195. The drive roller 195 is constantly being driven by the shaft 185. Upon operation of the pneumatic actuator, the piston is retracted, allowing the spring 199 to force the pressure roller 205 into engagement with the driving roller, which results in the movement of the strips of transfer film located between the rollers.

Positioned adjacent the drive and pressure rollers is a receiving tube 206, which is connected to any type of a conventional vacuum pump (not shown). The tube 206 is also connected to a collection container, which may be of any type and therefore is not shown. In operation, the strips of transfer film, after being fed from the drive roller 195 and the pressure roller 205, are sucked into the receiving tube 206 by the vacuum created by the vacuum pump, to be deposited in the collection container. The use of this vacuum source results in the tensioning of the transfer film from the time it leaves the supply reels to the time it is deposited in the collection container, thus allowing the film to be properly positioned adjacent the die element.

A general operation of the apparatus will now be explained. Referring to FIG. 9, it is seen that the strips 162 of transfer film are guided from the supply reels, located on the hub 159, to a position under the die element 134 by means of the guide rollers 160, 168, and 169. Upon the positioning of a record sheet beneath the die element by the belt 72 and the subsequent operation of the micro switch 110, the blocking rods 101 and the die element 134 are sequentially operated, resulting in the transfer film and the magnetic material contained thereon being bonded to the record sheet. As the die element 134 returns to its home postion, a micro switch (not shown) is tripped, thereby operating the actuator 204, which allows the pressure roller 205 to engage the strips of transfer film, thus coacting with the drive roller 195 to move the film and the record sheet bonded thereto towards the cooling element 180. Located in the operating circuit of this machine, which is of a conventional design and form no part of this invention, is a time delay device which deactivates the actuator 204 after a sufficient time has elapsed in which the record sheet has been transported from the die element 134 and a new record sheet has moved to trip the micro switch 110, thereby initiating a new operation of the die element.

Figure 10:
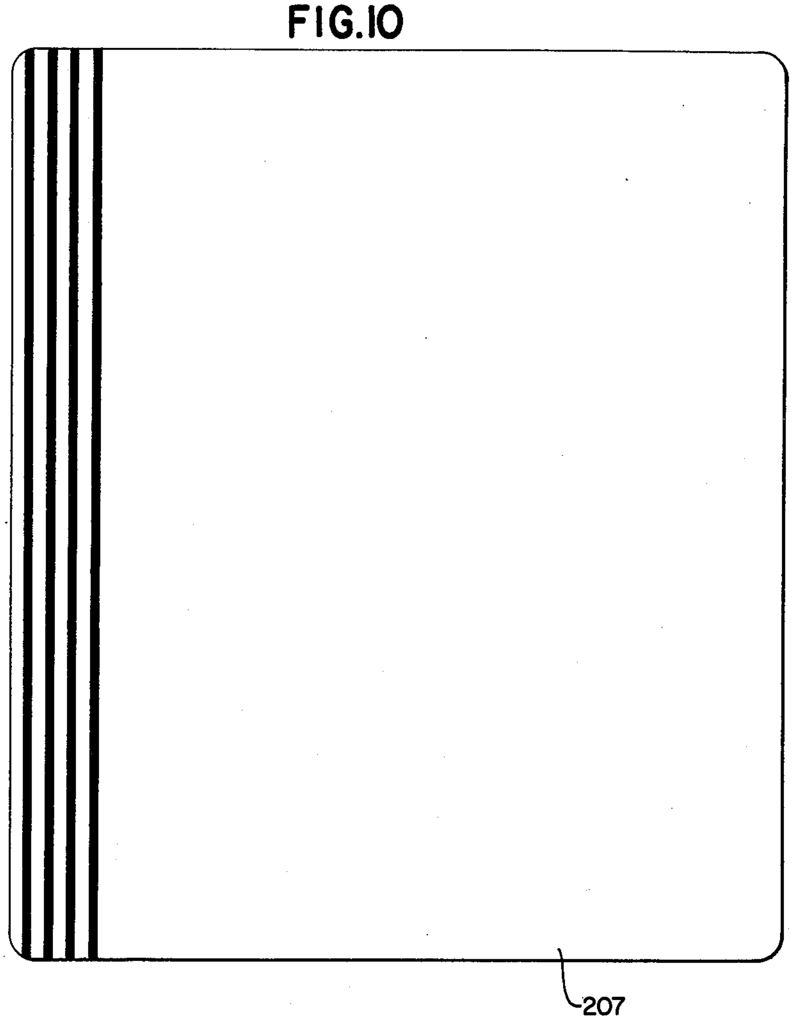
FIG. 10 is a view of the record sheet showing the strips of magnetic material bonded thereto.

During subsequent operations of the actuator 204, the record sheet moves, by means of the driving of the transfer film by the driving roller 195, beneath the cooling element 180, whereby the bonded magnetic coating is cooled, which allows the transfer film to be removed from the record sheet without rupturing the bonded magnetic coating. After leaving the cooling element 180, the record sheet is transported toward the guide roller 183, where the transfer film is peeled from the record sheet as it passes over the guide roller 183 toward the receiving tube 206. After this has occurred, the record sheet continues to move forward, thereby falling into a receiving bin, from which it is retrieved and stacked. FIG. 10 shows a finished record sheet 207, with four strips of magnetic coating applied to one side of the sheet.

From the foregoing, it is evident that the apparatus described herein will bond any number of strips of magnetic material to the back of the record sheet at a relatively high rate of speed. The use of the vacuum source for retrieving the separated transfer film allows the film to be constantly tensioned throughout the operation of the apparatus, thereby allowing for a continuous operation of the bonding apparatus, in addition to providing a means for transporting the separated transfer film to a collection area.

While the fundamental novel features of the invention have been shown, described, and pointed out as applied to the preferred embodiment, it will be understood that various omissions, substitutions, and changes in the form and details of the device illustrated in its operation may be made by those skilled in the art without departing from the spirit of the invention. It is the intention, therefore, to be limited only as indicated by the scope of the following claims.

What is claimed is:

1. In a machine for the application of a strip of magnetic material to a fibrous record sheet, comprising, in combination, (a) a first frame member supporting a stack of fibrous thin record sheets;

(b) a second frame member positioned adjacent said first frame member;

(c) a support member mounted on said second frame member;

(d) a supply of transfer film rotatably supported on said support member, said film having a heat-softenable coating of magnetic material;

(e) means for guiding said film along a predetermined path along said second frame member;

(f) a conveyor means consisting of twisted belts mounted within said second frame member for horizontally feeding said record sheets edgewise in succession along a path on said second frame member which converges with said transfer film;

(g) rotatable suction means mounted on said first frame member above said stack for feeding the top record sheet of said stack horizontally onto said conveyor means;

(h) a slidably-supported heated die element mounted on said second frame member adjacent the paths of the transfer film and the fibrous record sheet, said die element being moved when actuated, to a position in which said heated die element engages and presses said transfer film against the record sheet, thereby bonding the coating of magnetic material and the transfer film to the record sheet;

(i) a plurality of rods slidably mounted on said second frame member adjacent said die element, said rods being moved when actuated, to a blocking position in the path of the record sheet, thereby positioning the record sheet adjacent the die element;

(j) a switch-actuating member mounted adjacent said die element in the path of travel of said record sheet, said member being operated by a record sheet for sequentially actuating said rods and said heated die element;

(k) a third frame member positioned downstream of said die element;

(l) compressed air means mounted on said third frame member adjacent the path of said record sheet for cooling said bonded record sheet;

(m) means mounted on said third frame member for driving the transfer film intermittently a predetermined distance along said predetermined path whereby the bonded record sheet is transported by said transfer film from the die element to said cooling means;

(n) means mounted on said third frame member adjacent said driving means for separating the bonded transfer film from the record sheet during the operation of said driving means;

(o) and take-up means mounted adjacent said driving means for collecting the separated transfer film, said take-up means including a suction source for continuously tensioning said transfer film to transport said film to a deposit area and to allow for a continuous machine operation.

2. The machine of claim 1 wherein said guiding means includes a guide rail mounted on said second frame member adjacent said die element and a plurality of flexible guide members positioned on said second frame member to urge said record sheets into engagement with said guide rail.

3. The machine of claim 1 wherein said driving means includes a constantly-operating driving roller and a movable pressure roller and also includes means controlled by the operation of said heated die element for moving said pressure roller into engagement with said driving roller, thereby driving said transfer film.

4. The machine of claim 3 wherein said controlled means includes a resilient member for urging said pressure roller into engagement with said constantly-operating driving roller and an actuator means engaging said resilient member and operable to release said member to an urging position upon operation of said heated die element.

5. In a machine for the application of a strip of magnetic material to a fibrous record sheet, comprising, in combination, (a) a first frame member supporting a stack of fibrous thin record sheets;

(b) a second frame member positioned adjacent said first frame member;

(c) a first support member mounted on said second frame member;

(d) a plurality of reels of transfer film rotatably supported on said first support member, said film having a heat-softenable coating of magnetic material;

(e) a first conveyor means mounted within said second frame member for horizontally feeding said record sheets along a first path on said second frame member;

(f) rotatable suction means mounted on said first frame member adjacent the top record sheet of said stack for feeding the top record sheet onto said conveyor means;

(g) a heated die element mounted on said second frame member adjacent said first path of said record sheets, said die element being slidably supported for vertical movement when operated;

(h) means for guiding said transfer film from said reels along a second path, said second path converging with the first path of said record sheets under said die element to position said film on said record sheet;

(i) a second support member mounted on said second frame member;

(j) a plurality of rods slidably mounted in said second support member across said first path, said rods being normally positioned out of said first path and capable of being moved, when actuated, to a blocking position in said first path whereby a record sheet in said first path is positioned adjacent said heated die element;

(k) switching means mounted in said first path adjacent said rods, said switching means being operated by a record sheet to first actuate said rods and then operate said die element whereby said heated die element engages and presses said transfer film against the record sheet, thereby bonding the heated coating of magnetic material and the transfer film to the record sheet;

(l) a third frame member positioned downstream of said die element;

(m) a plurality of flat belts rotatably supported on said third frame member for supporting the bonded record sheet;

(n) means mounted on said third frame member for directing compressed air against the bonded record sheet for cooling the heated coating of magnetic material located thereon;

(o) means including a driving roller and a pressure roller mounted on said third frame member for driving the transfer film intermittently a predetermined distance along said first path, said means being actuated by said heated die element subsequent to a bonding operation, whereby the bonded record sheet is transported by said transfer film over said flat belts from the heated die element to said cooling means;

(p) means including a roller member mounted on said third frame member adjacent said driving roller for separating the cooled bonded transfer film from the record sheet during operation of said driving means;

(q) and take-up means mounted adjacent said driving roller for collecting the separated transfer film, said take-up means including a tube connected to a suction source for continuously engaging and tensioning said transfer film to transport said film to a deposit area and to provide a continuous machine operation.

6. In a machine for the application of a strip of magnetic material to a fibrous record sheet, comprising, in combination, (a) a first frame member supporting a stack of fibrous thin record sheets;

(b) a second frame member positioned adjacent said first frame member;

(c) a support member mounted on said second frame member;

(d) a supply of transfer film rotatably supported on said support member, said film having a heat-softenable coating of magnetic material;

(e) means mounted on said support member and said second frame member for guiding said film along a predetermined path;

(f) rotatable suction means mounted on said first frame member above said stack for feeding the top record sheet of said stack along a path converging with the path of said transfer film;

(g) a slidably-supported heated die element mounted on said second frame member adjacent the convergent paths of the transfer film and the fibrous record sheet, said die element being moved, when actuated, to a position in which said heated die element engages said transfer film and presses it against the record sheet, thereby bonding the coating of magnetic material and the transfer film to the record sheet;

(h) a plurality of rods slidably mounted in said second frame member adjacent said die element, said rods being normally positioned out of the path of said record sheet and operable to be moved, when actuated, to a blocking position in the path of said record sheets, thereby positioning the record sheet adjacent the die element;

(i) a switch-actuating member mounted on said second frame member in the path of said record sheets and operated thereby for sequentially actuating said rods and the said heated die element;

(j) a third frame member positioned downstream of said die element;

(k) compressed air means mounted on said third frame member adjacent the path of said record sheet for cooling said bonded record sheet;

(l) means including a driving roller and a pressure roller mounted on said third frame member for driving the transfer film intermittently in uniform steps at uniform time intervals along said path, said means being actuated by the operation of said heated die element, whereby the bonded record sheet is transported by said transfer film from said heated die element to said cooling means;

(m) means mounted on said third frame member adjacent said driving means for separating the bonded transfer film from the record sheet during the operation of said driving means;

(n) and take-up means mounted adjacent said driving means for collecting the separated transfer film, said take-up means including a suction source for continuously tensioning said transfer film to transport said film to a deposit area and to allow for a continuous machine operation.

References Cited by the Examiner

UNITED STATES PATENTS

| | | | |
|---|---|---|---|
| 1,779,425 | 10/30 | Feybusch | 156—542 XR |
| 2,356,951 | 8/44 | Runton | 156—541 XR |
| 2,628,929 | 2/53 | Persoon et al. | 156—238 |
| 3,024,557 | 3/62 | Frenkel et al. | 156—542 XR |
| 3,042,363 | 7/62 | Byers | 156—572 XR |
| 3,112,236 | 11/63 | Hartman | 156—566 XR |

ALEXANDER WYMAN, *Primary Examiner.*

JACOB STEINBERG, *Examiner.*